3,149,157
BROMINATION OF SALICYLANILIDE

Theodore E. Majewski and Wesley C. Stoesser, Midland, Mich., assignors to The Dow Chemical Company, Midland, Mich., a corporation of Delaware
No Drawing. Filed Apr. 2, 1962, Ser. No. 184,578
5 Claims. (Cl. 260—559)

This invention relates to a novel process for the bromination of salicylanilide. More particularly, this invention involves the bromination of salicylanilide in an aromatic hydrocarbon medium to produce a mixture rich in 4',5-dibromosalicylanilide.

A number of methods have been proposed for the bromination of salicylanilide with bromine. Common reaction media used in these methods are alcohol, water, and mixtures thereof. The use of such reaction media usually results in a product mixture relatively low in 4',5-dibromosalicylanilide but rich in other brominated products.

It is generally thought that it is considerably less difficult to brominate dibromosalicylanilide to tribromosalicylanilide than to brominate salicylanilide to dibromosalicylanilide. For this and other reasons, it was unexpected that use of a reaction medium containing an aromatic hydrocarbon would substantially hold the bromination reaction at dibromosalicylanilide. It was further unexpected that the predominant dibromosalicylanilide in the product mixture would be the 4',5-dibromosalicylanilide isomer.

The method of this invention may be started by mixing salicylanilide with an appropriate aromatic hydrocarbon, and optionally, water. Water may be present in an amount limited only by volumetric considerations. To the mixture is added bromine in the desired amount. The reaction mixture thus formed is then heated to the desired reaction temperature, such temperature being maintained until the reaction is substantially complete. Optionally, the reaction may be carried out in two or more steps, as by heating the reaction mixture to a desired temperature for a period of time, then raising or lowering the temperature, as desired, for a further period of time. When reaction is substantially complete, the mixture is cooled, and the product mixture of brominated salicylanilide is removed from the reaction medium as by filtering. The product may then be washed and dried if desired.

Appropriate reaction media in the process of the present invention are benzene, chlorobenzene, o-dichlorobenzene, toluene, and mixtures thereof. Water may also be present in an amount not incompatible with volumetric considerations. Water is desirable in an amount sufficient to pick up HBr as it is formed by the bromination reaction. Optimum water concentration is that which forms a constant boiling mixture with the HBr formed. It is to be noted that water is involved solely as an aid in the recovery of HBr and apparently does not affect the reaction of this invention.

Reaction temperatures at which the process of this invention is operable may range from about 50 to about 80 degrees centigrade. Appropriate reaction time may be from about one hour to about three hours.

For best results, reactants are preferably added in a ratio of about two moles of bromine per mole of salicylanilide. Ratios of from about one and one half moles of bromine per mole of salicylanilide to about three moles of bromine per mole of salicylanilide are operable.

As reaction progresses, the reaction mixture tends to thicken. This is probably due to the low solubility of the brominated reaction products. It is desirable that the reaction mixture be easily stirrable throughout the reaction time in order that bromination progress at a reasonable rate. Thus it may be seen that the amount of reaction medium to be used is that which will result in an easily stirrable final product mixture. Generally, reaction medium in an amount, by weight, of above five times the weight of salicylanilide to be brominated is adequate. Lesser amounts may be used with longer reaction times. Greater amounts may be used without deleterious effect and may even be desirable in some situations. Large excesses should be avoided as wasteful and uneconomical.

Washing of the reaction product, if desired, may be accomplished by use of portions of the pure reaction medium. Drying may be carried out at slightly elevated temperatures.

Salicylanilide is generally produced by condensing salicylic acid and aniline in a proper aromatic hydrocarbon reaction medium, such as chlorobenzene and the like. Salicylanilide is then separated from the reaction medium as by steam distillation.

As a further advantage of the present invention, the costly steam distillation separation step may now be eliminated. With agitation, water is added to the mixture of salicylanilide and aromatic hydrocarbon. The mixture thus formed is then filtered and the water layer removed. To the aromatic hydrocarbon layer containing salicylanilide is added bromine in accordance with the present invention. Thus, it is readily seen that the method of the present invention is easily adaptable to well known methods of making salicylanilide.

The product mixture of the process of the present invention usually contains 4',5-dibromosalicylanilide as the predominant single constitutent. Unreacted salicylanilide is usually removed in the washing step, but trace amounts may be present.

Mixtures produced by the process of this invention are useful because of their combined bacteriostatic properties and low oral toxicity, when compared with mixtures having 3,4',5-tribromosalicylanilide as the predominant constituent. If desired, the mixtures of this invention may also be used as sources of pure 4',5-dibromosalicylanilide.

The process of the present invention may be more easily understood in light of the following examples which are set forth to illustrate, and are not to be construed to limit, this invention.

Example 1

A slurry was prepared by adding, with stirring, 0.4 mole of salicylanilide to 550 milliliters of chlorobenzene. At a slurry temperature of about 70 degrees centigrade, 0.82 mole of bromine was added thereto. After addition of the bromine to the slurry, the temperature of the thus formed reaction mixture was maintained at about 70 degrees centigrade for about two and one half hours. At the end of this time, the mixture was cooled to 25 degrees centigrade and filtered. The solids left after filtration were then washed twice with 100 milliliter portions of chlorobenzene, and twice with 100 milliliter portions of ten percent ethanol. After washing, the solid product was dried at 85 degrees centigrade. A yield of 92.3 percent was obtained, the product having the following analysis:

| | Percent |
|---|---|
| 4',5-dibromosalicylanilide | 61.7 |
| 5-bromosalicylanilide | 14.9 |
| 3,5-dibromosalicylanilide, 3,4',5-tribromosalicylanilide | 23.1 |
| Salicylanilide | 0.3 |

Example 2

A slurry was prepared by adding, with stirring, 0.4 mole of salicylanilide to a mixture of 550 milliliters of chlorobenzene and 85 milliliters of water. At a slurry temperature of 70 degrees centigrade, 0.82 mole of bromine was added thereto. After addition of the bromine to the slurry, the temperature of the thus formed reaction mixture was maintained at about 70 degrees centigrade for about two and one half hours. At the end of the time, the mixture was cooled to 25 degrees centigrade and filtered. The solids left after filtration were then washed three times with 100 milliliter portions of 50 percent ethanol. After washing, the solid product was dried at 85 degrees centigrade. A yield of 92 percent was obtained, the product having the following analysis:

| | Percent |
|---|---|
| 4',5-dibromosalicylanilide | 59.0 |
| 5-bromosalicylanilide | 13.9 |
| 3,5-dibromosalicylanilide, 3,4',5-tribromosalicylanilide | 26.8 |
| Salicylanilide | 0.3 |

Using substantially the same procedure as above, but with the reaction medium in the presence of water to form a mixture containing 60 percent chlorobenzene–40 percent water, a product having the following anaylsis was obtained:

| | Percent |
|---|---|
| 4',5-dibromosaylicylanilide | 56 |
| 3,5-dibromosalicylanilide | 20 |
| 3,4',5-tribromosalicylanilide | 22 |
| 5-bromosalicylanilide | 2 |

*Example 3*

Using substantially the same procedure outline in Examples 1 and 2, salicylanilide was brominated in reaction media of benzene, o-dichlorobenzene, and toluene, to give a product mixture in which 4',5-dibromosalicylanilide was the predominant single component. Results of these brominations are here tabulated:

| | Reaction Medium Used | | |
|---|---|---|---|
| | Benzene, percent | o-Dichlorobenzene, percent | Toluene, percent |
| 4',5-Dibromosalicylanilide | 57.0 | 54.8 | 42.2 |
| 5-Bromosalicylanilide | 21.4 | 17.7 | 41.9 |
| 3,5-Dibromosalicylanilide | 21.1 | 27.5 | 13.9 |
| 3,4',5-Tribromosalicylanilide | | | |
| Salicylanilide | 0.5 | | 2.0 |
| Yield | 91.5 | 93.5 | 84 |

Various modifications may be made in the present invention without departing from the spirit or scope thereof, and it is to be understood that we limit ourselves only as defined in the appended claims.

We claim:
1. In a method of producing a mixture of bromination products of salicylanilide rich in 4',5-dibromosalicylanilide wherein the salicylanilide is contacted with bromine in a reaction medium whereby bromination is accomplished, the improvement which comprises providing as the reaction medium a material selected from the group consisting of benzene, chlorobenzene, ortho dichlorobenzene, toluene, and mixtures thereof.

2. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium, benzene.

3. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium, chlorobenzene.

4. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium, ortho dichlorobenzene.

5. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium, toluene.

References Cited in the file of this patent

UNITED STATES PATENTS

| 2,802,029 | Schuler | Aug. 6, 1957 |
| 2,997,502 | Mattson | Aug. 22, 1961 |

OTHER REFERENCES

MacArdle: The Use of Solvents, page 3 (1925).